United States Patent [19]
Poullos et al.

[11] Patent Number: 5,409,537
[45] Date of Patent: Apr. 25, 1995

[54] LASER COATING APPARATUS

[75] Inventors: Mark P. Poullos; Edmund M. Williams, both of Dallas, Tex.

[73] Assignee: Dunfries Investments, Ltd., St. Heller, United Kingdom

[21] Appl. No.: 153,785

[22] Filed: Nov. 17, 1993

Related U.S. Application Data

[60] Continuation of Ser. No. 934,414, Aug. 24, 1992, abandoned, which is a division of Ser. No. 500,687, Mar. 28, 1990, Pat. No. 5,200,230, which is a continuation-in-part of Ser. No. 419,652, Oct. 11, 1989, abandoned.

[51] Int. Cl.$^6$ ............................................. B05D 3/06
[52] U.S. Cl. ........................................ 118/667; 118/641; 118/712; 427/596; 359/202; 219/121.63; 219/121.8; 219/121.83
[58] Field of Search ............... 118/667, 641, 629, 712; 359/202; 250/205; 219/121.63, 121.83, 121.81, 121.8; 427/596

[56] References Cited

U.S. PATENT DOCUMENTS

| | | | |
|---|---|---|---|
| 4,180,307 | 12/1979 | Tateoka | 359/202 |
| 4,294,631 | 10/1981 | Anthony | 219/121 LM |
| 4,545,317 | 10/1985 | Richter | 118/712 |
| 4,572,941 | 2/1986 | Sciaky | 219/121.63 |
| 4,664,940 | 5/1987 | Bensoussan | 118/641 |
| 4,711,790 | 12/1987 | Morishige | 427/10 |
| 4,718,418 | 1/1988 | L'Esperance | 219/121.8 |
| 4,733,047 | 3/1988 | Cruickshawk | 219/121.63 |
| 4,761,534 | 8/1988 | Foulkes | 219/121.8 |
| 4,772,121 | 9/1988 | Trageser | 219/121.81 |
| 4,772,773 | 9/1988 | Hashimoto | 219/121.64 |
| 4,850,712 | 7/1989 | Abshire | 250/205 |
| 4,865,683 | 9/1989 | Burns | 219/121.8 |
| 4,918,284 | 4/1990 | Weisz | 219/121.8 |
| 4,937,422 | 6/1990 | Nagamine | 219/121.83 |
| 4,959,244 | 9/1990 | Penny | 427/53.1 |
| 4,987,044 | 1/1991 | Vassiliou | 359/202 |
| 5,026,976 | 7/1991 | Ortiz | 250/205 |
| 5,043,566 | 8/1991 | Andoh | 219/121.8 |
| 5,084,300 | 1/1992 | Zander | 118/641 |
| 5,192,580 | 3/1993 | Blanchet-Finoher | 427/596 |

FOREIGN PATENT DOCUMENTS

| | | | |
|---|---|---|---|
| 4025851 | 2/1972 | Germany | 219/121.81 |
| 1177367 | 7/1989 | Japan | 118/641 |
| 4348525 | 12/1992 | Japan | 427/596 |

*Primary Examiner*—W. Gary Jones
*Assistant Examiner*—John Hoffmann
*Attorney, Agent, or Firm*—T. D. Copeland; Stewart L. Gitler

[57] ABSTRACT

This invention embodies the process and apparatus for applying a fluorocarbon coating or film to a metal or other material surface of a substrate, and particularly for applying such coating to the hull of a ship, or to other objects to be submerged in fresh or saltwater, to protect their surfaces from corrosion, and/or from fouling by marine organisms, and to improve the aqueous slip of a vessel during the period the object will be exposed to either aqueous, atmospheric, or other environments; and to protect virtually any substrate surface from virtually any environmental or man-made hazard. This process utilizes a laser that generates an infrared laser beam, such as, but not limited to a carbon derived gas type laser, to assist in the preparation for and attachment of a film or coating to a prepared substrate surface.

3 Claims, 8 Drawing Sheets

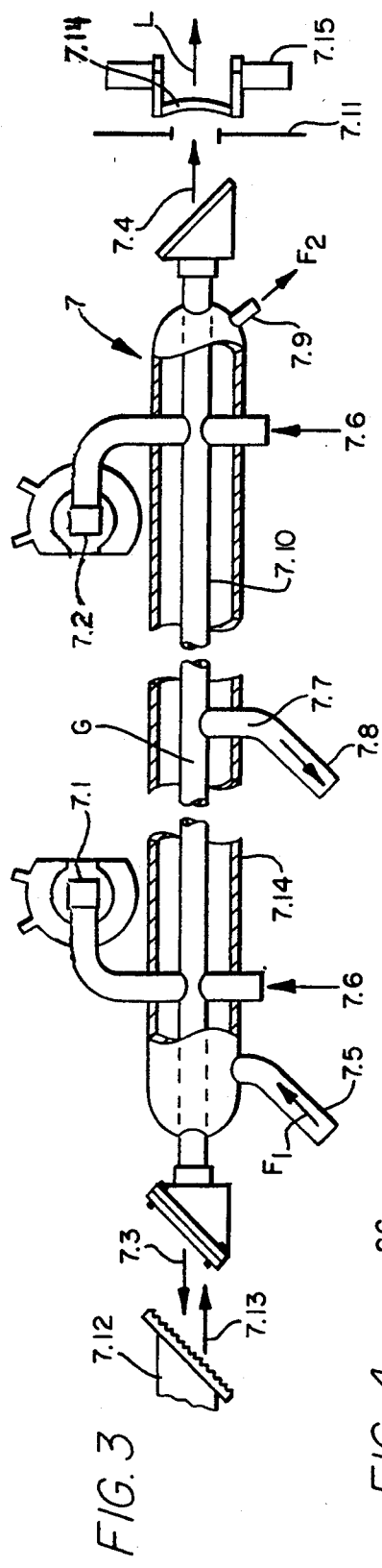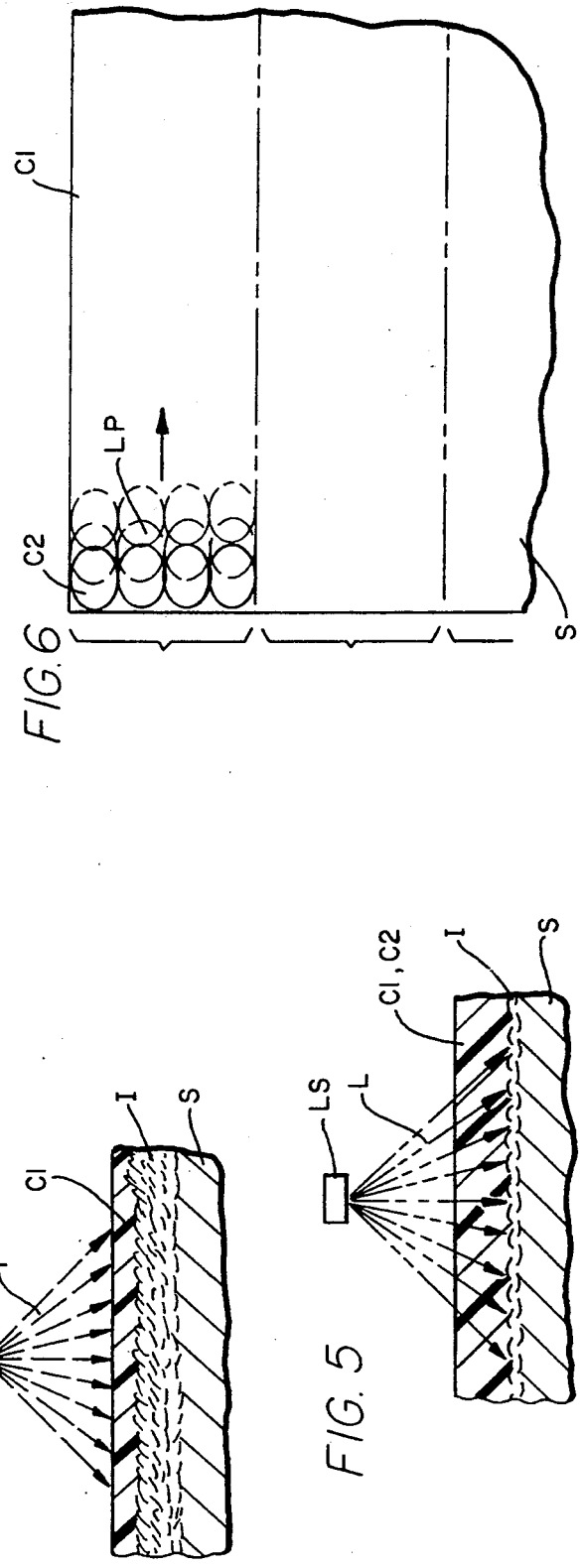

LASER COATING APPARATUS

This is a continuation of application(s) Ser. No. 07/934,414, filed on Aug. 24, 1992 abandoned, divisional application of application, Ser. No. 07/500,687, filed Mar. 28, 1990, U.S. Pat. No. 5,200,230, issued Apr. 6, 1993, which was a continuation in part (CIP) patent application of an earlier application filed by the present inventors, on Oct. 11, 1989, as Ser. No. 07/419,652, abandoned, and entitled Passive Marine Anti-Fouling Process. This prior patent application and all documents related thereto, which are of record in the United States Patent and Trademark Office at the time of filing this patent application are incorporated herein by reference.

BACKGROUND OF THE INVENTION

1. Field of Use

This invention relates to the field of use of fluorocarbon coatings applied to substrates of similar or other materials for the protection of the substrate, and to methods of such applications, employing electromagnetic radiation to fuse the coating to the substrate.

2. Prior Art

Many attempts have been made in the prior art to apply coatings to surfaces of objects for protective purposes. A relatively smaller number of attempts and resulting patents have occurred that employ the use of a laser as the energy source required. U.S. Pat. No. 3,743,777, issued Jul. 3, 1973, to Hans-Dieter Hanus, et al, discloses the use of a laser for hardening and/or curing paints after their application to a surface. U.S. Pat. No. 4,224,072, issued Sep. 23, 1980, to L. Stewart, discloses the use of a low power laser to sinter an enamel-like coating unto human teeth, in situ. Other techniques have been proposed in the other patents identified in the file of the foregoing referenced patents.

SUMMARY OF THE INVENTION

A primary object of this invention is to provide a process for creating a homogenious, pin-hole free, continuous solid coating on a surface to be protected.

Another object is to accomplish a fusion or baking of the coating and the substrate together, employing a relatively small size energy source (laser light generator) that is highly maneuverable, so that an unrealistically large oven is not required, as would be in the use of conventional baking operations, if the substrate were on a boat or other large object. As larger and larger objects are done they become more vulnerable to stress damage because of the excessive heat and time required to melt these fluorocarbons in conventional convection ovens. Also long exposure to hot oxygen in the melt state of the fluorocarbon materials will degrade this material even more, which creates a problem the instant invention resolves by localizing the heat more at the surface and forcing very quick and short melt and flow times.

A further object is to employ a coherent form of radiation that concentrates in a small portion of the electromagnetic spectrum whereby the fluorocarbon resin coating will absorb enough energy from the radiant laser beam to melt the coating, and yet will pass enough of this energy through the coating to heat the substrate at and near the joinder line to the same approximate temperature, so as to produce an efficient uniform bond of a fluorocarbon film and any underlying substrate that is capable of withstanding the heat required to melt the fluorocarbon resin into a film, contra oven problems.

An additional object is to utilize efficient and economical lasers that possess the characteristics required to operate within the wave lengths of coherent electromagnetic radiation compatible with both the fluorocarbon resin and the substrate materials.

And yet another object is to employ infrared lasers, such as carbon monoxide, carbon dioxide, methanol alcohol, and the like, lasers, whose wave lengths are above one micrometer, for fast and efficient heating, fusion, and bonding of the materials of the fluorocarbon coating and the usually metallic substrate.

A still further object of this invention is to provide a process that permits the application of a coating material to the surface of an object to be submerged in fresh or salt water, wherein the coating material possesses the multiple qualities of: preventing fouling by marine micro-organisms of the submerged object, such as ship's hull; and for increasing the aqueous slip (ability to move thru the water with a smooth sliding motion) of the external surface of the coating applied to a marine vessel: and for further protecting the surface of any object from environmental or man-made hazards, such as rust, corrosion, and the like.

And another object is to provide a laser fusion system having a real time feedback of temperature, variation of surface contour, and thermal distribution throughout the coating and for a distance into the substrate.

Another object is to provide an accurate measurement of the temperature of the fluorocarbon resin, (or plastic) and/or the substrate, without requiring physical contact therewith.

An additional object is to provide the ability to inject heat into the substrate faster than the substrate can dissipate the heat.

Another object is to provide a laser system that uses selective wavelengths to more accurately distribute heat between a powdered coating and the underlying substrate surface area.

And it is an object to provide a more efficient method of applying fluorocarbon resin to another object.

An important object of this invention is to provide a means and a method of applying thicker layers of fluorocarbon resins than possible using prior art methods and apparatuses, which greater thickness is critically important for use in harsh environments.

An equally important objective is to provide a method of heating only the fluorocarbon coating and the substrate interface, above the melting point, but below the vaporization point of the coating to avoid the release of dangerous HF gases.

BRIEF DESCRIPTION OF THE DRAWINGS

These and other objects and advantages will be apparent from an examination of the following specification and drawing, in which:

FIG. 3 is a detailed enlarged view, partly in section of the laser gun of FIGS. 1 and 2;

FIG. 4 is a schematic representation of the use of a powder gun to spray on fluorocarbon material to form the protective coating;

FIG. 5 is a schematic similar to FIG. 4, depicting the use of a laser to bond the coating of FIG. 4 to its substrate;

FIG. 6 is a schematic representation of the Lissajous pattern used to deploy the electromagnetic radiation output of the laser onto the substrate containing the fluorocarbon coating that is to be fused thereto;

FIG. 11 is a block diagram of additional details of the circuitry of FIG. 10.

DESCRIPTION OF THE PREFERRED EMBODIMENTS(S)

Figure 1:
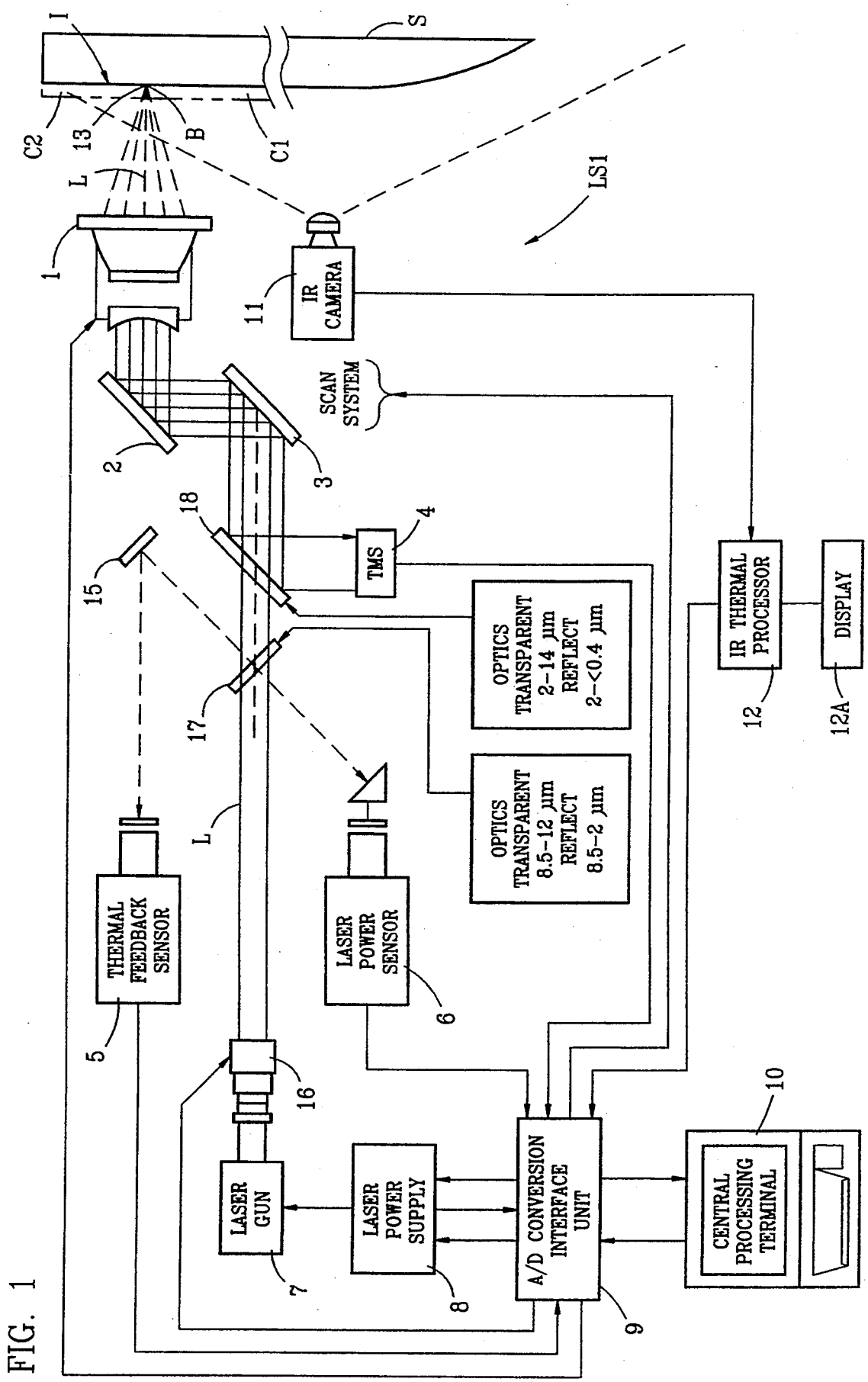
FIG. 1 is a schematic block diagram of one embodiment of the laser system and the method of this invention.

Referring now more particularly to the characters of reference on the drawing, it will be observed that the laser system LS1, of FIG. 1 includes a representation of the electronic circuitry necessary to direct the laser beam "L" onto the substrate S, which in this case is a ship's hull in dry dock preparatory to being coated with a selected material, which may be a fluorocarbon resin, such as PVF, FEP, PTFE, PFA, and the like, the applied coating being identified as C1. After the laser bonding operation is completed, the fused on coating is identified as C2 in FIGS. 1, 2, 5-6.

One example of the steps for applying the initial powder coating C1, and preceding the formation of the protective coating C2, include:
1. Cleaning the metal substrate by any known method, including sandblasting.
2. Prepare surface of substrate to accept bond and radiation by treating with phosphoric acid etch solution.
3. Where required, pre-heat substrate surface with laser beam L, and scan target surface, using the galvonometer mirrors, with a sawtooth waveform variable scan rate between about 50-100 Hertz in the "X" axis, and 66.67 cycles/per second in the "Y" axis, over a predefined surface area, using power input to laser of 150 watts.
4. Electrostatically charge the substrate to polarity opposite that of the spray "P" emitted by the powder spray gun SG.
5. Using the static spray gun SG, spray on coating of fluorocarbon powder, such as PFA, using 80-100 KV charge to a thickness of approximately 125 um.
6. Repeat the spray operation until desired thickness of coating obtained. (using 16 um particle size of PFA powder, a thickness of or above 2 mm is attainable).

Figure 2:
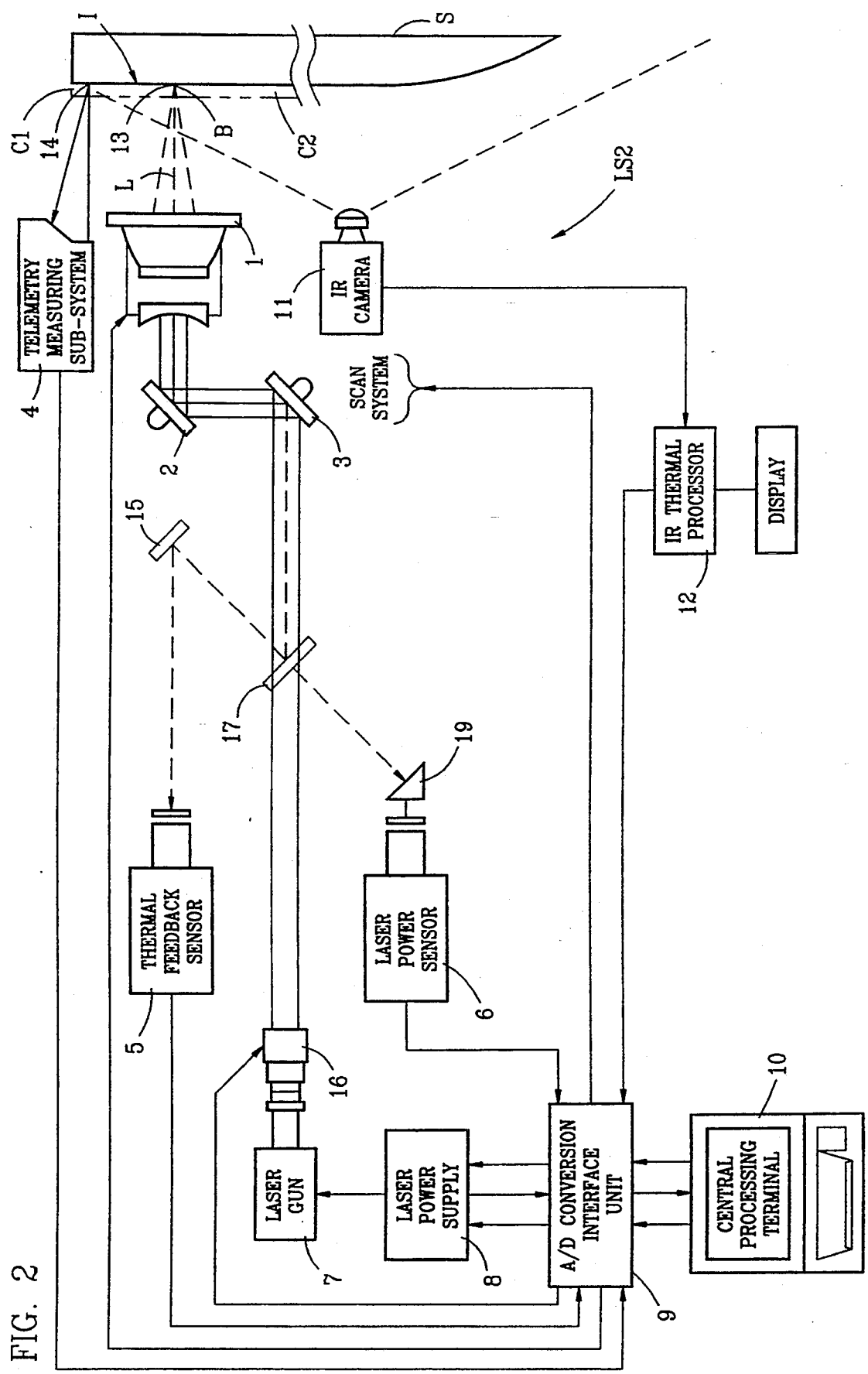
FIG. 2 is a view similar to FIG. 1, of another embodiment of this invention.

Prior to using the laser system LS1 of FIG. 1, or laser system LS2 of FIG. 2, it is necessary to make certain adjustments and settings for various articles of the equipments shown. The IR camera 11 and the IR thermal image processor 12 must be set for the correct emissivity value of the surface being treated. A typical value for this setting would be 0.85 for mild steel. The IR sensor 5, must be set to its own correct emissivity value based on its own optical path. A typical range for this value is 0.70-0.92.

If pre-heat scanning is employed, the grating tuned laser 7, should have its defraction grating set for 10.6 microns wavelength. If post-heat scanning is used, the grating tuned laser should be set for a wavelength that will evenly distribute the IR radiation between the coating or dispersion layer 01 and substrate interface layer I, by following the Spectral Transmission and Absorption Response Curves of the coating or dispersion layer. This allows a more uniform and equal temperature rise in these layers.

The telemetry measuring sensor 4, of FIG. 1, is placed in the optical path of the laser beam L and its output passes through the scanning optical corrector 1. This allows for distance measurements to be accurately made in real time, as the laser beam L sweeps across surface of the interface of substrate S and coating C being fused.

The telemetry measuring sensor 4 is alternatively placed next to the laser scanning optical corrector 1 in FIG. 2. In this process, and using this system, LS2, "look ahead surface profiling" can be done, as indicated at 14, and the results stored in solid state memory thru the interface 9 and recalled as the laser beam reaches these points.

A central processing unit terminal 10 activates the X and Y scanning circuits of the analog and digital conversion interface circuit 9 to initiate scanning in raster fashion through X and Y scanning mirrors 2 and 3 respectively. The telemetry measuring sensor 4 then measures the correct distance to the target area and sends electronic signals back to the A & D conversion interface unit 9, which then correctly focuses the optical scanning corrector 1 for a consistant optical focus onto the target.

CPU terminal 10 then activates the shutter control circuits in blocks 8-10 of FIGS. 1 and 2, which then open the IR laser shutters 7.11 and initiate the IR lasing action through laser 7.

The IR laser beam leaving the lasing cavity of laser 7 may be adjusted for format and alignment through waveguides, Axicon lenses, beam expanders and/or condensers, etc., as indicated by box 16. As the beam passes through the first optical deflector 17, a small percent is reflected back to a broad band IR sensor 6, which accurately measures current real time laser power. An analog or digital signal is then generated and sent back to the A and D conversion interface circuit 9, where the laser power from power supply unit 8 is locked into the value specified by the CPU terminal 10, for the instant situation.

The laser beam may then pass through a second deflector 18, as seen in FIG. 1. The beam then reflects off the Y scanner mirror 3, and off the X scanner mirror 2, for correct positioning of the beam during raster scanning. And the beam then passes through optical scanning corrector 1, which keeps the beam focused to a consistant size and angle with respect to the target 13, which then increases in temperature and emits IR radiation proportional to its own temperature. Some of this IR radiation passes back through the scanning optical corrector 1, reflects off the X and Y scanning mirrors 2 and 3, and passes through the rest of the optical elements, which are transparent to IR radiation wavelengths transmitted by the laser and by thermal emissions from the target 13. The target radiation then reflects off a special optical element 17 that is transparent to the IR laser wavelengths (8.5 thru 12 um, for example), and that is reflective to target wavelengths (2 to 8.4 $\mu$m, for example). This reflected IR energy is then directed to IR feedback sensor 5, by mirror 15 which in turn generates an analog or digital signal that is sent back to the A and D conversion interface 9 for real time processing to correctly control the sweep rate of the fastest moving axis (X or Y), and/or regulate the laser power as needed when a parameter limit has been approached.

Some of the target IR radiation is collected by IR camera 11, which passes IR video data to IR thermal image processor 12, which includes a display 12A for visual monitoring. Thermal activities, such as rise, peak, fall and dispersion temperature data is then passed to the A & D conversion interface 9, and then, in correct format, this data goes to the CPU terminal 10, where software interprets the data and modifies other process parameters. For example, the "slowest moving scan axis (X or Y), the dispersion spray thickness and temperature, laser power distribution throughout the system, pre-heat scan temperature, post-heat scan temperature, etc."

In one example of the operation of the laser system of this invention, referring to FIG. 5, the IR radiation L, of 10.6 micron wavelength is projected onto the target area of the coating (initially C1) on substrate S, whereupon the IR beam largely passes thru the coating C1 to the interface region I, whereupon it heats this region and part of the beam is absorbed by the coating C1 and melts the coating until it fuses into a completely molten state, and since the fusing temperature of the substrate and the coating are substantially the same, particularly its interface region, the adjacent materials fuse together at or near their interface, and the surface of the C2 solidifies to be substantially smooth, pin-hole free and flat, with a coating thickness of about 0.02–0.125 mm thick per pass, with variation of ±20%.

As the beam L is reflected from the target as seen in FIGS. 1 and 2, it passes thru the optical corrector 1 and onto scanning mirror 2 to mirror 3, and thence thru telemetry measuring system mirror 18, and this signal is picked up by the telemetry scanner 4, which relays the signal thru the interface 9 and computer 10 to generate and transmit adjustment and connection signals to the remainder of the system LS1 and/or LS2.

The elements shown in FIGS. 1 and 2 are described by function below, and are specifically identified in Exhibit A, attached hereto and made a part hereof by reference, by manufactures part or model number.

The galvo optical corrector 1, of FIGS. 1 and 2, maintains a constant beam spot size over a scanned target surface, by moving internal lenses closer and further away from each other at very high speeds to maintain the constant desired spot size. The signal to initiate this lens movement comes from the system's A and D conversion interface unit 9.

The X galvo mirror 2, deflects the beam spot, the IR feedback view spot, and the telemetry light path in the X axis. The "X" position is supplied from the A and D conversion interface 9.

The Y galvo mirror 3, deflects the beam spot, the IR feedback view spot, and the telemetry light path in the Y axis, and its position is also supplied from the A and D conversion interface 9.

The telemetry sensor device 4 electronically measures the distance of the target surface beam spot B from the corrector 1, by sending a short pulse of coherent light through the demonstrated optical path and measuring the amount of time for the reflection to return. This procedure is repeated many times a second, so these measurements can be made even when the optical path is sweeping. This measurement can be performed separate and apart from the optical path as demonstrated in FIG. 2.

The high speed thermal sensor 5 measures IR emissions off of the beam spot which is aligned with this sensor's view field through components 15, 17, 18, 2, 3, and 1. The measured IR emissions are in turn converted to a precaliberated voltage level that corresponds to a temperature value based upon the known emissivity level of target 13. This voltage level is in turn sent to the A and D conversion interface 9, so that proper thermal management of the target's surface can be more accurately controlled. This IR sensor 5 will also use filters that prevent this device from "seeing" the same part of the electromagnetic spectrum that the laser beam is generating.

The laser power feedback sensor 6 measures the current real time laser power coming from laser 7 through formating optics 16. A voltage level is generated that is proporitonal to laser power output and is fed back to the A and D conversion interface for locking the laser power to its proper levels.

The IR laser or laser 7 supplies coherent infrared radiation (IR), for the controlled fusion of the surface materials. A grating will be used when the fundamental wavelength of the lasing gas medium needs altering to to accommodate the fusing materials. Power in the form of high DC voltage or RF excitment is required from the laser power supply 8. The laser beam L generated by this laser is sent through beam formating optics 16, thermal view spot laser beam combiner optics 17 and telemetry laser beam combiner optics 18, X and Y galvo mirrors 2 and 3, and galvo optical corrector 1, which directs the laser beam L onto the target 13.

Laser power supply 8 delivers electrical power in the form of AC or DC voltages or RF excitment as required by the laser cavity 7. This subsystem requires a signal input from the A and D conversion interface 9 for determining the proper laser power needed from the laser 7.

The analog & digital (A and D) conversion interface unit 9 uses RAM driven digital to analog (D/A) converters for dynamically positioning the X and Y galvo mirrors 2 and 3 along with positioning the optics in the optical corrector 1.

This subsystem also takes the thermal reading from the thermal feedback sensor 5 as an analog level, which is then converted into a digital value for computer access and compared against Min. and Max. storage registers with the results being:
  a. If the incoming thermal level is below minimum (Min.) register value, then the laser power is left at maximum (Max.) power.
  b. If the incoming thermal level is above Min. register value, but still below Max. register value, then the laser power is reduced by a linear amount proportional to the required levels at the irradiated surface.
  c. If the incoming thermal level is above both the Min. and Max. register values, then the laser power is shut completely off until this value falls below the Max. register value.

The output of the digital thermal signal value can be stored in a RAM, whose address is the same as the X and Y galvo RAM address, so that an accurate thermal profile can be obtained. This feature is only needed for diagnostic purposes and may not be required under normal operations.

The signal from telemetry sensing device 4 can be analog or digital depending on the subsystem version. This signal is then revalued and sent as an analog signal to optical corrector device 1, for the correct optical focus of the beam and the view spot.

Peak thermal input values are received from the thermal image processor 12, which in turn are compared to the IR Min. register, and the IR Max. register, within interface unit 9, (these registers are independent of the previously mentioned registers) for the purpose of comparing the readings of the IR camera 11. The results of these comparisons are:
  a. If the peak thermal input value received from subsystems 11 and 12, is below IR Min. value, then the laser head movement is stopped until this value has been met.
  b. If the peak thermal input value received from subsystems 11 and 12 is above IR Min. register, but below IR Max. register, then the laser head movement can proceed by a linear amount based on where the actual value lies between Min. and Max.
  c. If the peak thermal input value received from sybsystems 11 and 12 is above that of the IR Max. register, then the laser shutters are automatically closed and the slowest moving axis stops until the peak temperature falls below IR Max. register value.

This subsystem needs input from the central processing terminal 10 for getting the correct register values for: Min. register, Max. register, IR Min. register, and IR Max. register. Additional input is needed for loading and reading the RAMs for the X and Y galvo position values, and the thermal profile values.

The central processing terminal is where the input parameters for subsystems 9 are supplied for:
  a. Determining the X and Y galvo scan pattern and rates.
  b. Min. and Max. temperature values allowed.
  c. For general management of the system in real time.

The IR camera 11, looks into the part of the IR spectrum that is not being used by the laser. A thermal image is generated from the target surface being irradiated, and this image is sent to the IR thermal image processor.

The IR thermal image processor 12 processes the analog video signal generated by the IR camera 11, and converts this image into a digital graphics map of the surface being treated. A central processing unit, already part of this subsystem 12, in turn extracts important thermal image data, such as peak temperature, maximum temperature, rise and fall temperatures, and sends this data as an analog or digital signal (determined by the subsystem model version) to the A and D conversion interface subsystem 9. In turn this thermal image can and will be generated and displayed on a video monitor for the person operating this system so that quality control is possible.

Target 13 is the surface of the structure being coated; while target 14 is the surface of the structure being struck by distance measuring light source. "B" represents the beam spot of laser light at the substrate.

The IR mirror 15 is a gold or copper plated mirror for reflecting the IR emissions from the target surface, and optical alignment of view spot.

The IR beam formating optics 16 is intended for correctly formating the laser beam footprint for proper delivery through beam path elements 17, 18, 3, 2, and 1. This subsystem may include wave guides for proper delivery to the laser head itself and the Axicon lenses for a more flat and even profile of the beam footprint. This part of the system may also include beam expanders, beam condensors, and beam projection optics. In some optical versions, this is where the galvo optical corrector 1 would be located.

The IR beam spot and IR sensor view spot combiner optics 17, comprise an optical element especially made to be highly transparent to the laser wavelengths (e.g., 0.5 um to 12 um), and highly reflective to IR emissions from the target (e.g., 2 um to 8.5 um).

The IR beam spot and telemetry light source combiner optics 18, comprises an optical element 18, especially made to be highly transparent to both laser wavelengths and IR emissions from the target (e.g., 2 um to 12 um), and highly reflective to the telemetry 4 light source wavelengths (e.g., 300 nm to 2 um).

FIG. 3 shows the laser (cavity) 7, partly in cross-section with details of equipments included or associated therewith, shown as decimal adders to the basic reference numeral 7. For example, 7.1 and 7.2 represent the discharge electrodes that ionize the lasing gas medium within gas filled tube 7.10. After the laser IR light beam is generated within the tube it exits at 7.3, strikes diffraction grating 7.12, whereat it is reflected back as shown at 7.13, as a beam having a specific wavelength that is desired in this system, and is determined by the selected diffraction grating. A typical value for the discharge of electrodes 7.1 and 7.2, is 16 KV of direct current, and a typical value for the wavelength is 9.2 um to 11.7 um of reflected radiation 7.13.

The beam exiting from the tube or cavity 7.10 is identified by arrow 7.4, just before it strikes the mirror lens 7.14 of front coupler 7.15, where some percentage of the photons of the beam 7.4 exit as a beam of coherent IR light "L" to pass through other optical structures on its way to the target substrate.

Fluid coolant F for keeping the laser tube 7.10 cool, enters the tubular shell 7.14 through inlet tube 7.5, as F1. This coolant exits from shell 7.14 as warmed coolant F2 via outlet tube 7.9, and is refrigerated and recycled back through inlet 7.5.

The gas mixture which forms the lasing medium enters the lasing tube or cavity 7.10 via inlet ports 7.6, and exits as exhaust gas through port 7.8. An electrode of opposite potential from electrodes 7.1 and 7.2 is located adjacent exhaust port 7.7, and is identified as ground electrode 7.7.

The gas mixture used will contain selected percentages of helium, nitrogen, and carbon dioxide. The specific percentages used will depend on the desired intensity and wavelength of the laser beam produced. A typical range of percentages used might be 80% He, 12% N2, and 8% CO2. This gas mixture is ionized within tube 7.10 by the discharging voltage from electrodes 7.1, 7.2, and ground electrode 7.7, and it is this discharge that initiates the lasing action within tube 7.10 and beyond. Notwithstanding the selected mixture ratios of the various gases constituting the gas mixture employed, the laser is identified as a carbon dioxide, or CO2 laser in this embodiment of our invention.

Laser cavity shutters 7.11 are opened when the output laser beam L is to be used in this system, and are closed when no output is desired. When the system is in operation, the intensity of the laser beam may be increased by increasing the discharge voltage from electrodes 7.1 and 7.2, as well as, or in lieu of increasing the gas pressure within laser cavity 7.10.

In FIG. 4, a cross section through the substrate S and coating C1 illustrates conceptually the depositing of fluorocarbon powder P from a spray gun SG, and forming an interface I at the joinder of the material being deposited and the existing substrate. FIG. 5 shows conceptually what happens when the deposited powder P and the substrate are heated by a laser beam L from a laser source LS. The coating, now identified at C2 is substantially transparent to the wavelength of the laser beam employed, so that the beam passes through the coating C2 and heats the substrate sufficiently at or near the interface area I, so that this heat is sufficient to melt the coating C2 and a portion of the substrate at the interface and cause the joining materials to fuse at the interface area I.

Figure 8:
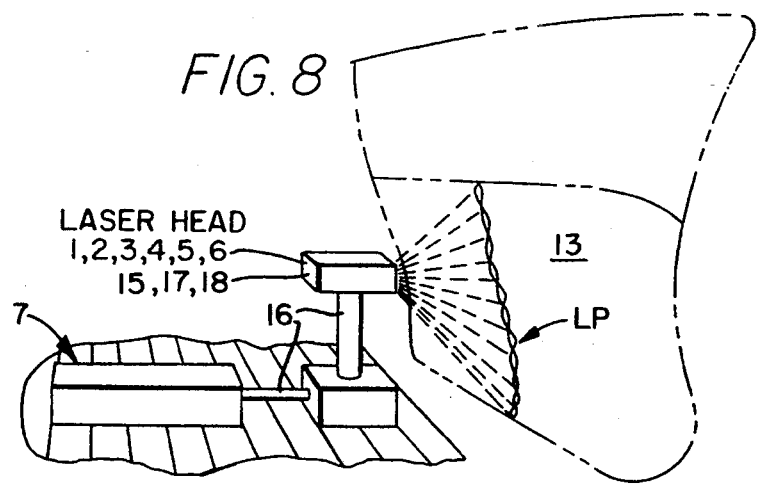
FIG. 8 is one example of the laser system of this invention used as a highly portable unit.
Figure 9:
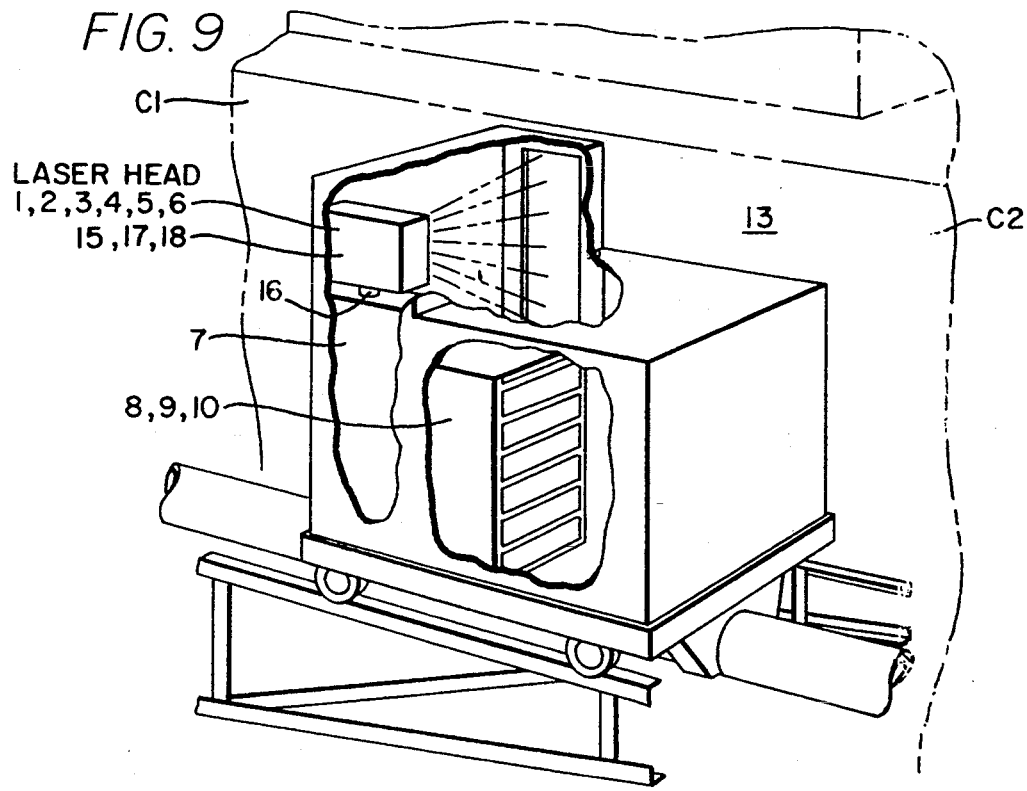
FIG. 9 is an enlarged detail view of another example of the use of the laser system of this invention (having more complex auxiliary equipment) in a guided mobile unit.

FIG. 6 is a schematic illustration of a portion of substrate, which may be a ship's hull, that is being subjected to this method of protection by the application of an exceedingly smooth, pin-hole free, non-corrosive, coating of fluorocarbon material, by the use of a laser fusion technique. The controls of the previously described laser will cause the laser beam to traverse many desired patterns while fusing the fluorocarbon coating to the substrate. One such pattern employed with excellent results is known as the "Lissajous" pattern, identified at "LP" in the drawing FIGS. 6 and 8.

Figure 7:
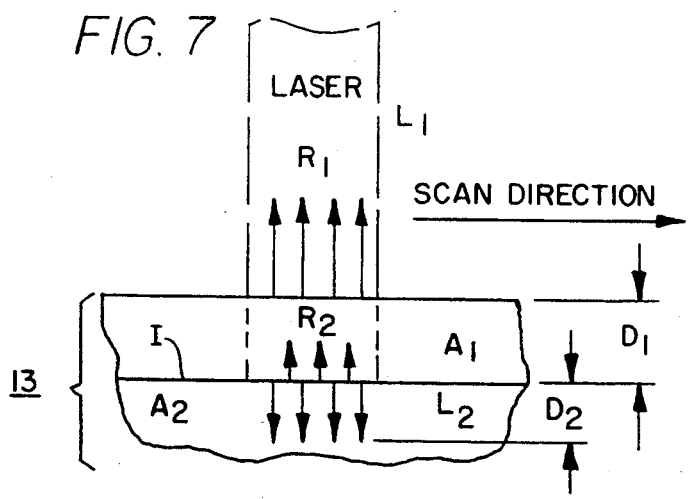
FIG. 7 is a schematic representation of the coating and substrate being irradiated by the controlled laser output beam.

FIG. 7 is a schematic illustration of cross-section taken, through the substrate and coating at the target area during laser fusion, for the purpose of approximating the power distribution between the coating layer and the substrate and interface regions. In this figure, the following definitions need to be observed:

R1 = Reflected IR laser beam radiation back from the coating surface, measured in percent.

R2 = Reflected IR laser beam radiation back from the substrate and into the coating, in percent.

A1 = The level of absorption by the film, measured as a percent per centimeter of thickness of the coating (or film).

A2 = The level of absorption of the substrate to the laser beam, measured as a percent with respect to reflectivity and transmissivity. The formula for this relation is: $A2 = L1 - R1 - A1 - R2$ D1 = The thickness of the coating measured in mm.

D2 = The depth of heat penetration into the substrate.

Using the above factors, the approximate total power delivered by the laser beam L1 should be sufficient to accommodate the energy utilized in generating the following conditions: Total Power = $R1 + A1 + R2 + A2$.

Figure 10:
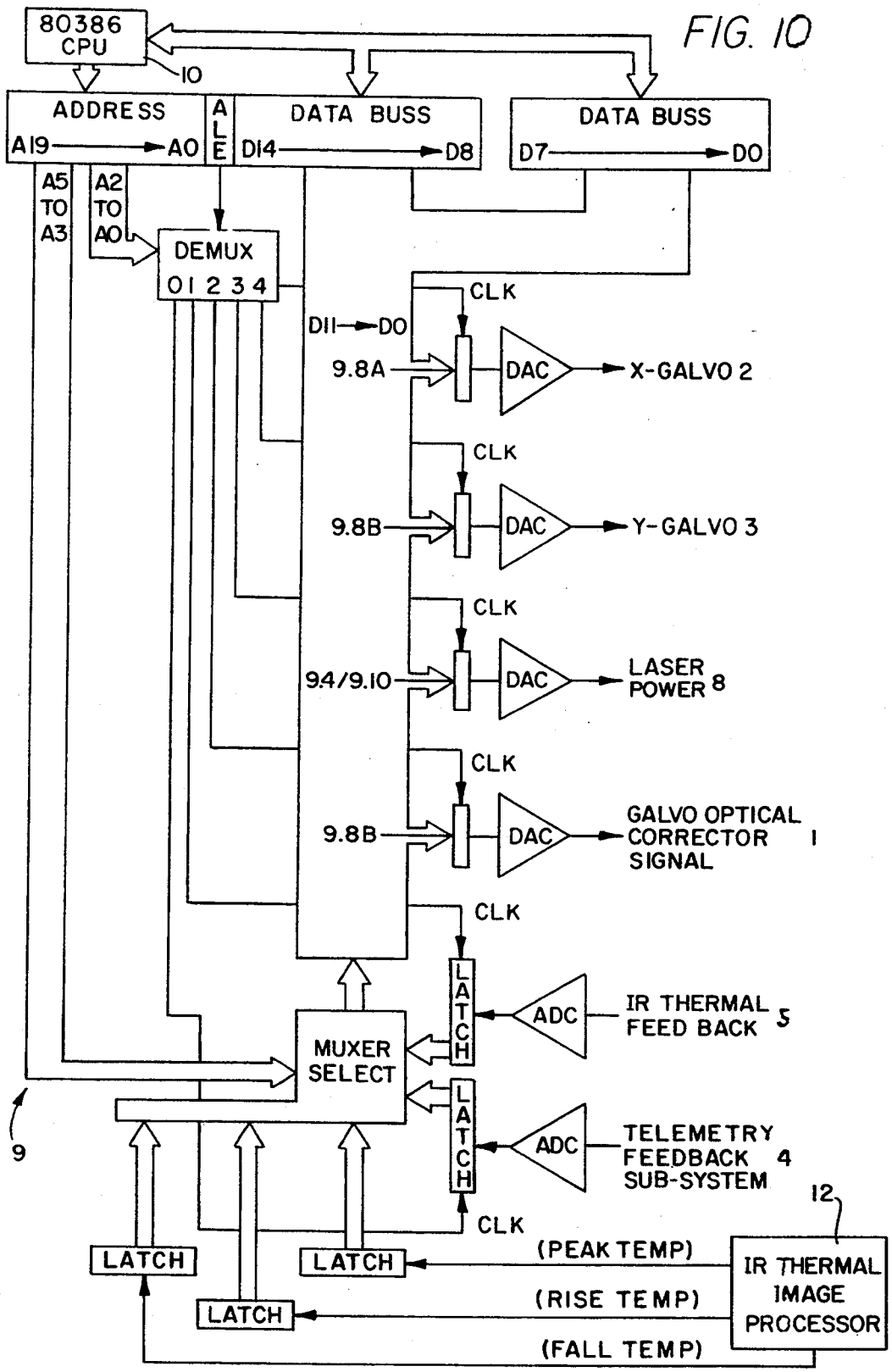
FIG. 10 is a schematic and block diagram of the analog and digital conversion interface used in the laser control system of this invention.
Figure 11A:
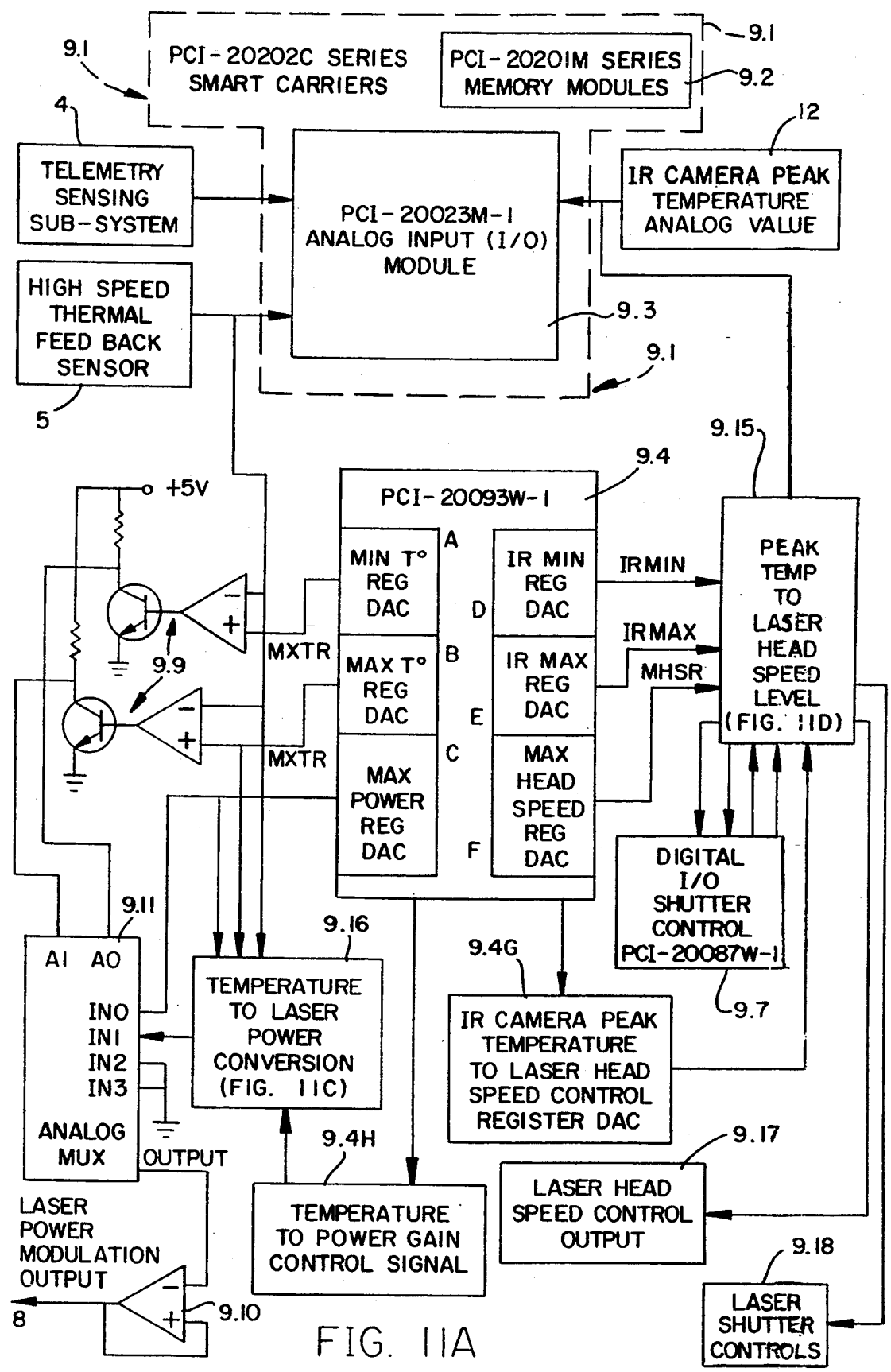
FIG. 11A represents the thermal management subsystem of the analog and digital conversion interface system of FIGS. 1, 2 and 10, in block and circuit form.
Figures 11B, 11C:
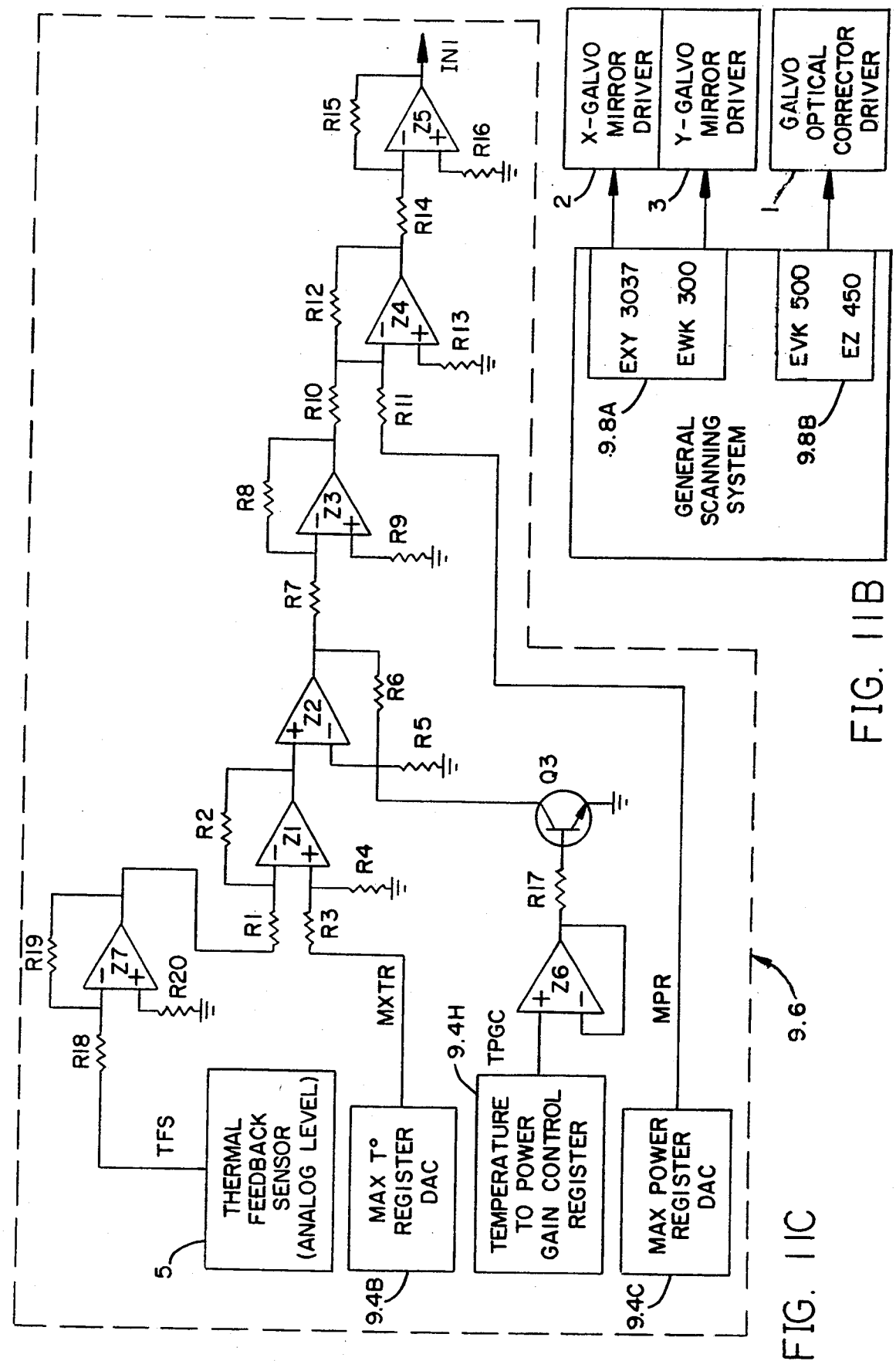
FIG. 11B represents the X-Y-Z scanning subsystem of the analog and digital conversion interface system of FIGS. 1, 2 and 10, in block diagram format.
FIG. 11C represents the temperature to laser power conversion subsystem of the analog and digital conversion interface system of FIGS. 1, 2 and 10.
Figure 11D:
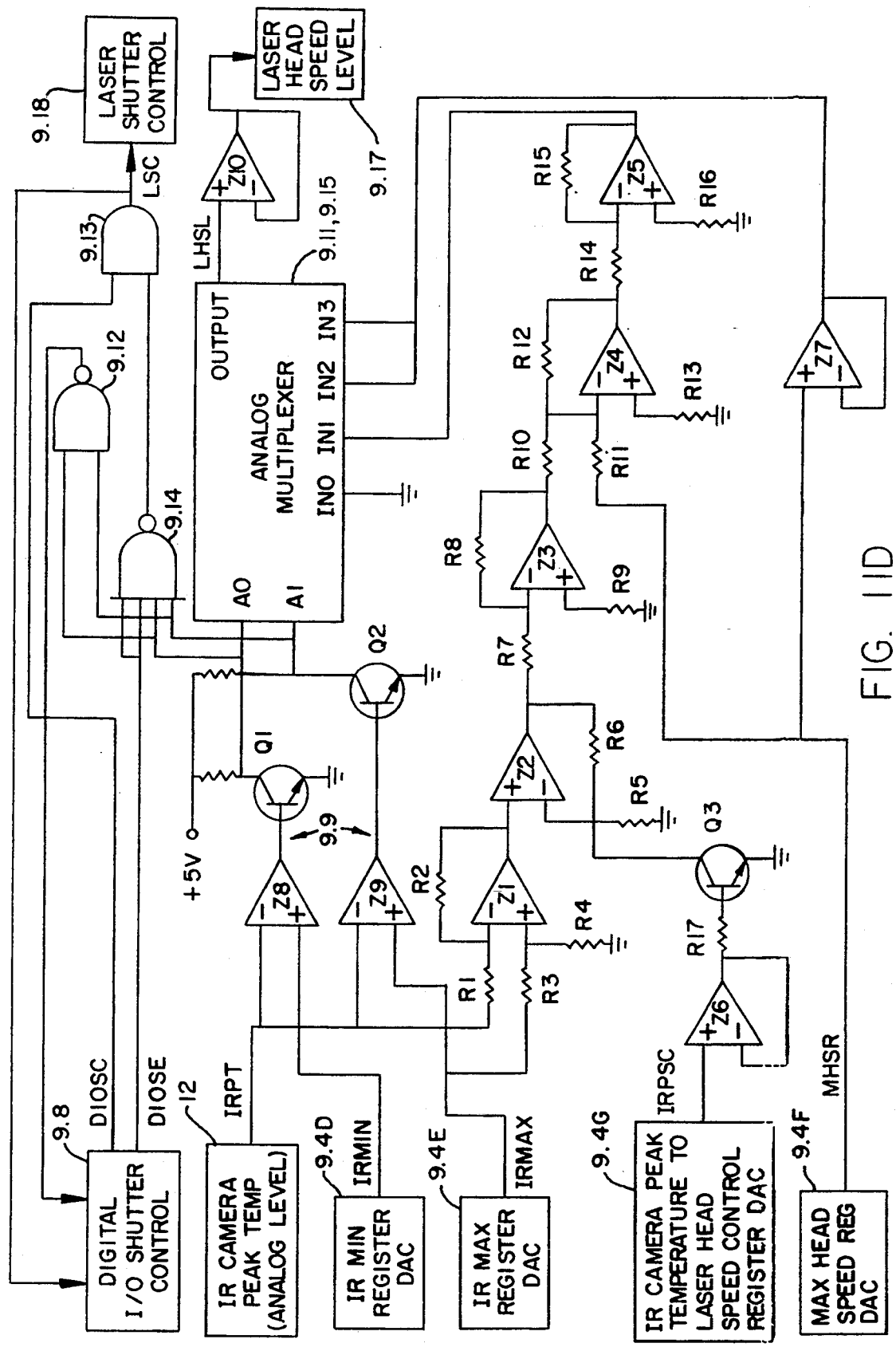
FIG. 11D represents the peak temperature to laser head speed level conversion circuit subsystem of the analog and digital conversion interface system of FIGS. 1 2 and 10.

FIG. 11 (i.e. FIGS. 11A–11D) represents the internal circuitry of the analog and digital conversion interface unit 9 of FIGS. 1, 2, and 10 and discloses the circuit relationship between each of the incoming, outgoing, and internal signals of block 9. In FIG. 11A, it is seen that a "Smart" carrier board 9.1 contains and supports memory module 9.2 for high speed capture of incoming analog to digital conversion (ADC) data by the analog input module 9.3 for the central processing terminal 10. This high speed I/O module 9.3 (Burr Brown Part No. PCI-20023M-1) is used to receive incoming analog telemetry sensing signals or levels from the high speed telemetry measuring subsystem sensor 4 of FIGS. 1 and 2, and from the thermal feedback sensor level, which comes from unit 5 of FIGS. 1 and 2, and from the IR camera peak temperature analog signal which comes from thermal image processor 12. These signals are captured in real time by the central processing terminal 10 and will be used by the supporting software for the correct manipulation of the entire system by way of values obtained via the Max laser power register unit 9.4C and the Max laser head speed register unit 9.4F, as well as from the X and Y scan pattern rates of unit 9.8A, and from the Galvo optical corrector memory map stored in unit 9.8B of FIG. 11B.

FIG. 11A also contains PC Board 9.4 which can generate up to 8 analog output channels with total throughput of 31,200 outputs/sec. or up to 3900 outputs/sec. per channel. Output values are supplied by central processing terminal 10 for Min. T° register DAC 9.4A, for minimum temperature comparison for thermal feedback sensor 5, and for Max T° register DAC 9.4B for maximum temperature comparison for thermal feedback sensor 5, and for Max power register DAC 9.4C, for the maximum laser power allowed, temperature to power gain control signal DAC 9.4H, for controlling the gain of the delta between Max T° register temperature value and actual temperature measured, which in turn controls the laser power modulation output from amplifier 9.10 to laser power supply unit 8, when the temperature falls between minimum and maximum set values for this system.

Also from unit 9.4, signals for monitoring and manipulating the laser head speed will be done, by supplying DAC analog levels for IR Min register DAC of unit 9.4D which is for referencing the minimum peak temperature value; IR Max register DAC unit 9.4E, which is for referencing the maximum peak temperature value; Max laser head speed register DAC 9.4F, which is for referencing the current maximum speed for the laser head movement, and IR camera peak temperature to laser head speed control gain register DAC 9.4G, which is for controlling the gain of the temperature delta between the maximum peak temperature reference and the measured peak temperature thru the circuit of unit 9.15.

There are additional circuits that are added outside of the PCI boards that further control the supplied signal levels. These are two comparators 9.9 that compare minimum and maximum temperature values with incoming high speed temperature measurements made by sensor 5 and the result of these two comparators are used to properly address an analog multiplexer unit 9.11 which in turn selects which correct analog level will be supplied to the laser power modulation input of unit 8, from amplifier 9.10; for example:

| INPUT | A1 | A0 | Description of selection result: |
|---|---|---|---|
| IN0 | 0 | 0 | Output = Max Laser Power Reg. DAC 9.4 C |
| IN1 | 0 | 1 | Output = Temp. to Laser power conversion output 9.16 |
| IN2 | 1 | 0 | Output = 0 v |
| IN3 | 1 | 1 | Output = 0 v |

In FIG. 11B, the General Scanning System shows that it supports RAM driven DACs that drive limited turn servo motors 2 & 3 for X & Y galvo mirror drivers from electronic unit 9.8A, along with RAM driven DACs that drive galvo optical corrector positioners from electronic unit 9.8B. This system is also controlled by central processing terminal 10.

In FIG. 11C the temperature to laser head power conversion is done by taking the difference between real time analog level or signal TFS, from the thermal feedback sensor 5 complemented through 27 who's gain is equal to $-(R19/R18)$ and subtracting this level or signal MXTR from Max T° register DAC of 9.4B (MXTR) through operational amplifier Z1 which results in an output equal to (R2/R1)*(MXTR-Z7 output) while assuming R1=R3 and R2=4. The resultant level is then passed on to op amp Z2 for positive amplication where the output gain is equal to (1+(R6/R5)), but modified by Q3's parallel resistance. This resultant output is then amplified again by op amp Z3 which results in a gain of $-(R8/R7)$. The resultant of this output is then added to analog level (MPR) through op amp Z4 which results in a gain of $-((R12/R10)*(Z3output)+(R12/R11)*(MPR))$. The resultant of this output is then passed on to op amp Z5 where the analog level is turned back tobeing positive again with the resulting gain of $-(R15/R14)$. The meaning of this circuit can be summarized with the expression: ((MXTR-TFS*Z7)*Z1*Z2*Z3+MPR)*Z4*Z5 where the "*" is the multiplication factor of the amplifiers.

In FIG. 11D, an analog level is supplied by IR thermal image processor 12 of FIG. 1 and 2; this analog level of IRPT, represents the peak temperature over the treated surface and is compared to IRMIN and IRMAX analog reference levels from units 9.4D and 9.4E using comparators Z8 and Z9 of units 9.9, which in turn addresses the correct input for analog multiplexer which supplies the current laser head speed level LHSL to amplifier Z10, and unit 9.17 via unit 9.15.

In the event that the peak temperature signal IRPT is below IRMIN and IRMAX then the output analog multiplexer level LHSL from unit 9.11 will equal 0v.

In the event that the peak temperature signal IRPT is greater than IRMIN, but less than IRMAX, then the difference of IRMAX and IRPT is taken and amplifed by op amp Z1 who's output will equal (R2/R1)*(IRMAX-IRPT), which in turn will be positively amplified by Z3 who's gain will equal (1+(R6/R5)) but modified by the parallel resistance of Q3. This result will in turn be amplified again by Z3 with a gain of $-(R8/R7)$. That result in turn will be added to the Max Laser Head Speed register DAC 9.4F output signal MHSR, using summing amplifier Z4 who's output will equal $-((R12/R10)*(Z3output)+(R12/R11)*MHSR)$. The result of this level will be returned back to its positive level value with op amp Z5 who's gain will equal $-(R15/R14)$. This value will be brought to IN1 of analog multiplexer 9.11 that supplies signal LHSL to amplifier Z10 and to laser head speed level unit 9.15, and laser head speed control unit 9.17. Therefore, the meaning of this circuit can be summarized by the expression: ((IRMAX-IRPT)*Z1*Z2*Z3+MHSR)*Z4*Z5 where the "*" is the multiplication factor of the amplifiers.

In the event that IR peak temperature exceeds both IRMIN and IRMAX then the output signal of Max laser head speed register DAC unit 9.4F, which is the MHSR value, will be applied thru block 9.15 and to laser shutter control functional unit 9.18, located in unit 8, and its signal LSC will send a logic "0" to subsystem 8 for causing shutters 7.11 to be closed.

Digital I/O shutter control signals DIOSC and DIOSE from unit 9.8 can override the peak temperature to laser head speed level conversion shutter control signals from units 9.13 and 9.14, to temporarily shut down the system via output signal LSC when the peak temperature is too excessive too frequently.

In summary, one example of the steps forming the final protection coating C2, include:

1. Prepare target surface 13 by sandblasting the surface with sand particles that are the approximate size or multiple size of the IR wavelength to be used.
2. Focus the radiometer of camera 11, onto the target surface to be treated.
3. Determine the proper emissivity of the surface to be treated by referring to the radiometer manufacturer's reference manual on known emissivity values for known surface materials. However if the surface material is unknown; then with all lights out and the surface kept from any type of wind or breeze, place a precision thermal measurement probe on the unknown surface and view this same surface area with the radiometer cameras. Then adjust the emissivity value up and/or down until the radiometer measures the same temperature as the thermal probe. When the two temperatures match, this represents the correct emissivity value of the unknown material at room temperature. Some materials exhibit different emissivity values at different temperatures, therefore, it is advisable to confirm the emissivity value again at normal process temperature and use this latter value, if different.
4. Adjust the thermal feedback sensor's emissivity value up and/or down while measuring the target's surface temperature with the radiometer and comparing the two values. When these two values match, the correct emissivity value has been found for the thermal feedback sensor.
5. Apply the initial powder coating, which is PFA, in this example, to target surface 13 which is 2 mm thick mild steel, by setting the electrostatic sprayer charge to 80 kv and then spraying the target surface until a fixed even thickness layer builds up.
6. Set the laser head itself to a distance of 1 meter from target.
7. Set the maximum output power of laser 7 to 150 watts.
8. Set the Max power register 9. to 140 watts.
9. Set the Max T° register limit to 360° C.
10. Set the Min T° register limit to 330° C.
11. Set the IR Max register 9. limit to 360° C.
12. Set the IR Min. register 9. limit to 342° C.
13. Set the Max head speed register 9. to 1 cm/sec.
14. Select program software for a scan width of 5 cm sawtooth.

15. Select program software ofr a scan height of 5 cm sawtooth.
16. Select program software to maintain a beam diameter of 7 mm at current target surface distance.
17. Select program software for a "X" axis scan rate of 66.67 Hz.
18. Select program software for a "Y" axis scan rate of 50.00 Hz.
19. Activate laser shutters 7.11 through software control via terminal 10.
20. When target temperature reaches 342° C. then apply second coat.
21. When the current coating melts, set the electrostatic spray gun to 100 Kv and apply another spray burst.
22. Each successive coat adds 0.1 mm of thickness.
23. Continue until desired thickness is achieved. (i.e. 2 mm in one example).
24. When the last coat melts, select program software to reduce heat and close shutters, thus shutting off laser 7.
25. The finished surface will shortly acquire a glossy finish that is pinhole free and possesses increased aqualous slip, and increased resistance to corrosion and other environmental or man-made hazards.

An itemized list of the principal operating components of the system of this invention is shown in Exhibit A, attached hereto and made a part hereof by reference.

From the foregoing description and examples it will be seen that there has been produced a process and an apparatus that substantially fulfills the objects of this invention as set forth herein. These inventions are not limited to examples shown herein, but may be made and performed in many ways within the scope of the appended claims.

| Reference Number | Part Name or Designation / Manufacturer's Part No. / Mfg. or Supplier |
| --- | --- |
| 1 | Galvo Optical Corrector / EVK500 & EZ450 / Laser Lines, Ltd. |
| 2 | "X" Axis Scanning System / EXY3037 & EWK300 / Laser Lines, Ltd. |
| 3 | "Y" Axis Scanning System / EXY3037 & EWK300 / Laser Lines, Ltd. |
| 4 | Telemetry Measuring Sub-system: Laser Light Source / 10R-TX / Metax Telemetry Sensor / 2L10 / SiTek |
| 5 | Thermal Feedback Sensor / J15D5-M204-S01M / EG & G Judsons |
| 6 | Laser Power Sensor / J15D12-M204-25OU / EG & G Judsons |
| 7 | Laser / PRC1500 / PRC Corporation |
| 8 | Laser Power Supply & Signal Input / (Included with Laser, Ref. #7) |
| 9 | Analog & Digital Conversion Interface (Decimal #'s represent functional and/or physical units as appropriate): |
| 9.1 | Smart Carrier Board / PCI-20202C / Burr Brown |
| 9.2 | Memory Module / PCI-20201M / Burr Brown |
| 9.3 | Analog Input Module (ADC) / PCI-20023M-1 / Burr Brown |
| 9.4 | Analog Output Module (DAC) / PCI-20093W-1 / Burr Brown |
| 9.5 | PC Buss Expansion Box / PCI-20055H-4 / Burr Brown |
| 9.6 | PC Buss Interface / PCI 20063A / Burr Brown |
| 9.7 | Digital I/O Shutter Control / PCI-20087W-1 / Burr Brown |
| 9.8 | Dual Axis Scanning Sub-System / (Included in Ref. Nos. 2 & 3) |
| 9.8A | X & Y Scanner Electronics (Included in REf. Nos. 2 & 3) |
| 9.8B | Galvo Optical Corrector Electronics (Included in REf. No. 1) |
| 9.9 | Comparator including TTL Output / LM311 / Texas Instruments |
| 9.10 | Operational Amplifier (Op Amp) / LM318 / Texas Instruments |
| 9.11 | Analog Multiplexer (MUX) 1 TMS 6005 & SN 7442 / TI |
| 9.12 | NAND Gates / SN74LS00 / Texas Instruments (TI) |
| 9.13 | AND Gates / SN74LS08 / TI |
| 9.14 | Four Input NAND Gate / SN7420 / TI |
| 9.15 | Printed Circuit Board (PCB) Assembly / (Laser Head Speed function) |
| 9.16 | PCB / (Temperature to laser Power Conversion function) |
| 9.17 | PCB / (Laser Head Speed Control Function) |
| 9.18 | PCB / (Laser Shutter Control Output function) |
| 10 | Central Processing Terminal / Industrial 80286 / Zenith & Heath |
| 11 | IR Camera / Probeye 7000 / Hughes |
| 12 | Thermal Image Processor / Probeye 7000 / Hughes |
| 13 | Surface Application (Target) / PTFE, PFA, FEP, TFE, ETFE, PVF, CTFE / DuPont, et al |
| 14 | Telemetry Reflection (Beam Spot) / Not Applicable |
| 15 | AU or CU Plated Mirror (for IR Optics) / 12 MFC 007 / Melles Griot |
| 16 | Beam Delivery & Formating System: |
| 16.1 | Beam Delivery IR Wave Guide / Per Customer Specifications of distance from Laser to Laser Head / Johnson & Johnson |
| 16.2 | Beam formating optics / Per Customer Specifications of power density at distant target and beam footprint shape / Melles Griot or Laser Power Optics Co. |
| 17 | Beam-IR View Spot Combiner Optics / Per Customer Specifications of lens with maximum transparency for IR wavelengths of 8.5–12.0 um and maximum reflectance for IR wavelengths of 2.0–8.5 um. / STC Components, Ltd. |
| 18 | Beam-Telemetry Combiner Optics / Per Customer Specifications of lens with maximum transparency for IR wavelengths of 2.0–14.0 um and maximum reflectance for IR wavelengths of 0.4–2.0 um. STC Components, Ltd. |

What is claimed is:

1. A system for use in fusing a continuous pinhole-free coating of material onto a substrate at an interface region between the coating and substrate, comprising in combination:
   a. a laser system including an optical scanning means located at a distance from said coating for exposing said coating to a coherent electromagnetic radiation laser beam of a selected wavelength sufficient to penetrate said coating and raise the temperature of said coating and fuse said coating and said substrate at the interface region;
   b. feedback means that is operative back through said optical scanning means to control an intensity of said radiation laser beam in response to a temperature and a distance of said pinhole-free coating from said optical scanning means to provide the continuous pinhole-free coating securely fused to said substrate;
   c. a laser head having a power supply and signal handling circuitry and being capable of projecting said laser beam and focusing the laser beam to form a spot of small diameter onto a target comprising said substrate and coating, for fusing said coating onto said substrate;
   d. a central processing unit and an analog and digital conversion interface unit;
   e. a thermal feedback sensor and a laser power sensor operatively connected with said analog and digital conversion interface unit;
   f. said analog and digital conversion interface unit operatively connected between said central processing unit and features a-d and g-i of said system;
   g. a telemetry measuring sensor operatively connected with said laser head through said interface unit and receiving signals indicating a distance from said optical scanning means to said beam spot on said target;
   h. a camera trained on said substrate and an image processor to receive signals from said camera and process said camera signals and relay camera output signals to said analog and digital conversion interface unit; and
   i. means connected to said thermal feedback sensor for aligning a view spot coaxially with the laser beam so that a thermal measurement can be made in real time by said thermal feedback sensor so that the laser beam intensity can be adjusted instantaneously.

2. A system as in claim 1, wherein said telemetry measuring sensor is placed ahead of said optical scanning means to perform look ahead surface profiling.

3. A system for use in fusing a continuous pinhole-free coating of material onto a substrate at an interface region between the coating and substrate, comprising in combination:
   a. a laser system including an optical scanning means located at a distance from said coating for exposing said coating to a coherent electromagnetic radiation laser beam of a selected wavelength sufficient to penetrate said coating and raise the temperature of said coating and fuse said coating and said substrate at the interface region;
   b. feedback means that is operative back through said optical scanning means to control an intensity of said radiation laser beam in response to a temperature and distance of said pinhole-free coating from said optical scanning means to provide the continuous pinhole-free coating securely fused to said substrate;
   c. a laser head having a power supply and signal handling circuitry and being capable of projecting said laser beam and focusing the laser beam to form a spot of small diameter onto a target comprising said substrate and coating, for fusing said coating onto said substrate;
   d. a central processing unit and an analog and digital conversion interface unit;
   e. a thermal feedback sensor and a laser power sensor operatively connected with said analog and digital conversion interface unit;
   f. said analog and digital conversion interface unit operatively connected between said central processing unit and features a-d and g-i of said system;
   g. a telemetry measuring sensor operatively connected with said laser head through said interface unit and receiving signals indicating distance from said optical scanning means to said beam spot on said target; and
   h. means connected to said thermal feedback sensor for aligning a view spot coaxially with the laser beam so that a thermal measurement can be made in real time by analog and digital thermal feedback sensor so that said the laser beam can be adjusted instantaneously.

* * * * *